Oct. 12, 1954
R. M. CANNON
2,691,334
TRACTOR-TREAD TRACK DIGGER
Filed July 11, 1950
3 Sheets-Sheet 1
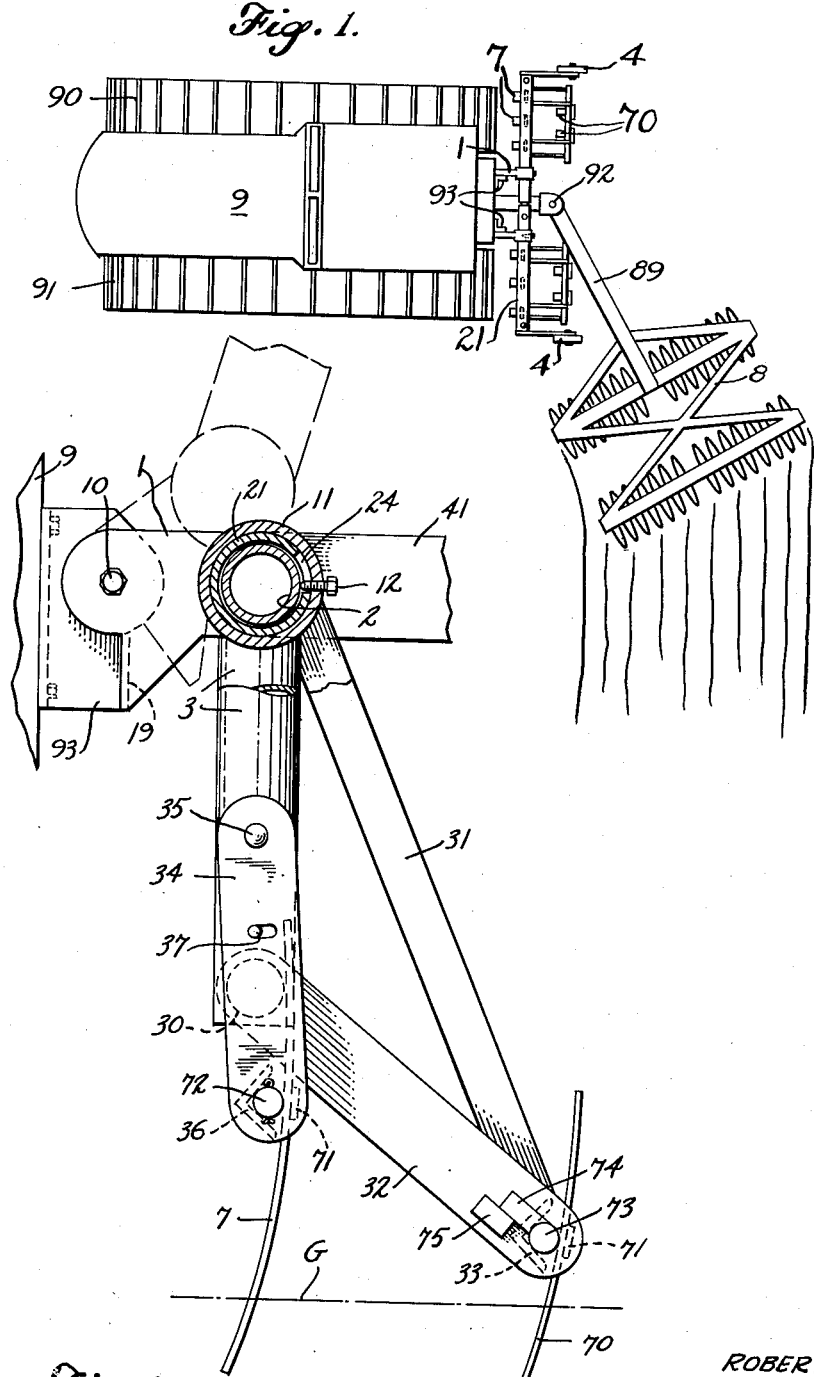
INVENTOR.
ROBERT M. CANNON
BY
Reynolds, Beach & Christensen
ATTORNEYS

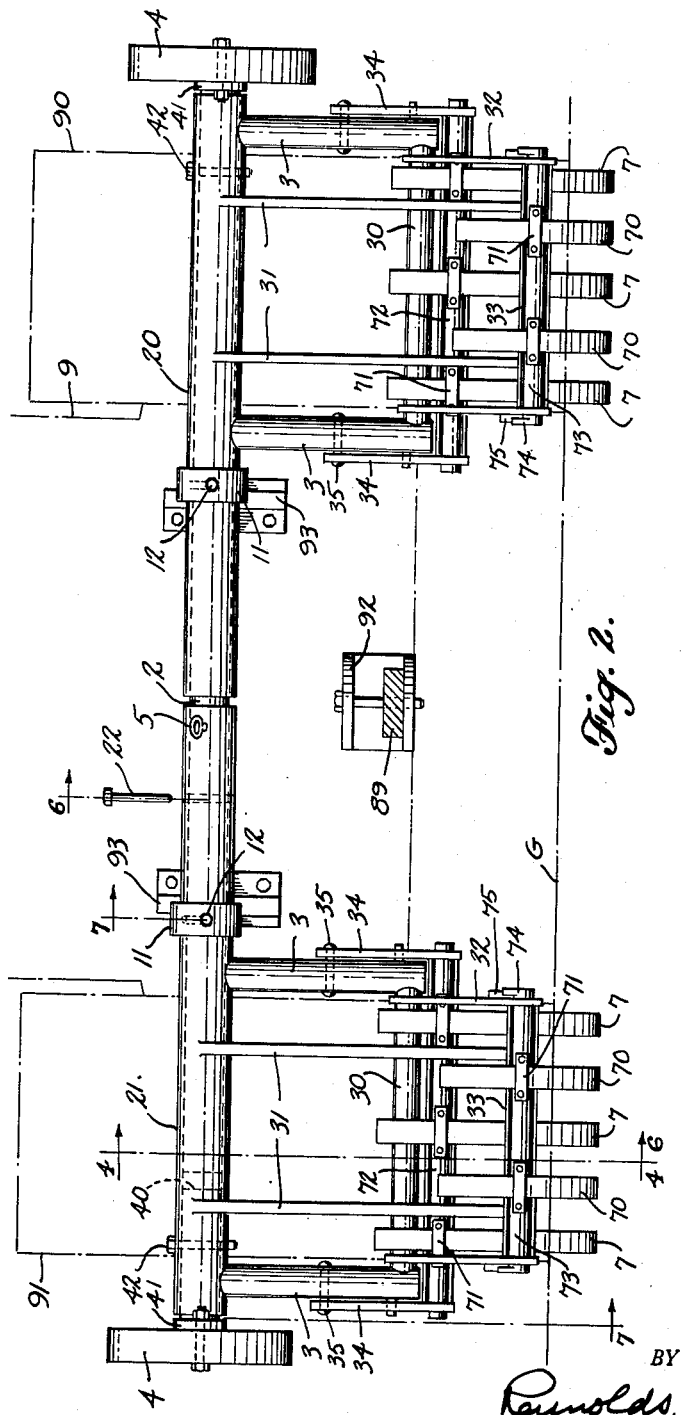

Oct. 12, 1954
R. M. CANNON
2,691,334
TRACTOR-TREAD TRACK DIGGER
Filed July 11, 1950
3 Sheets-Sheet 3
Fig. 4.
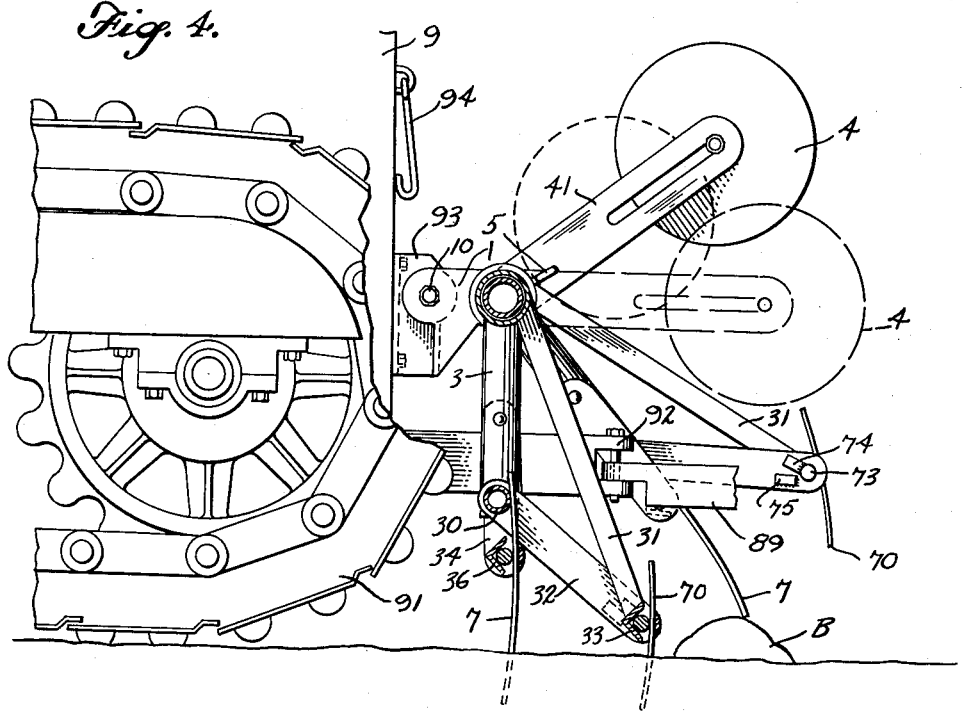
Fig. 5.
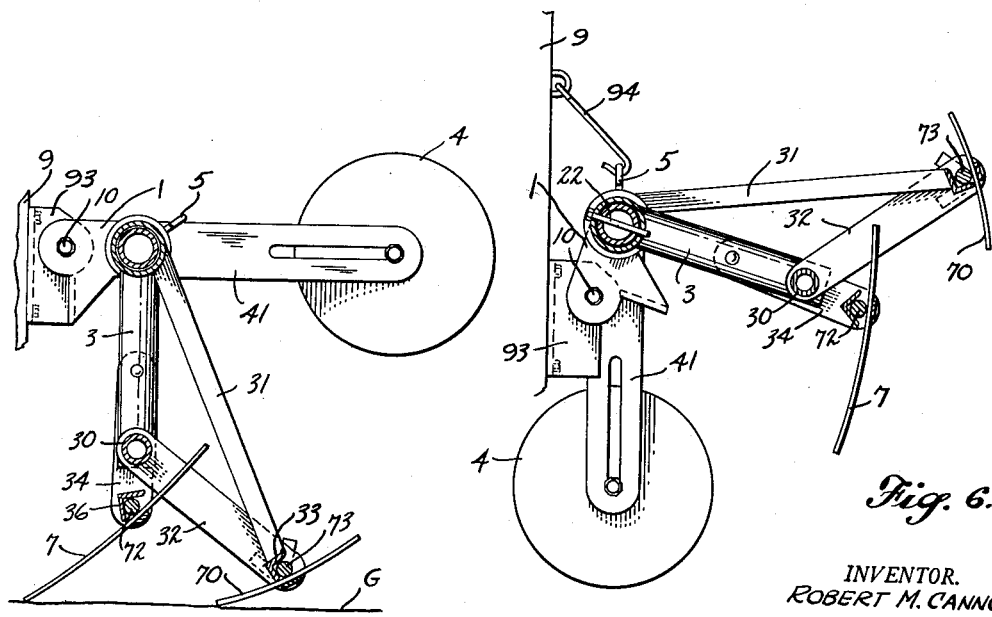
Fig. 6.
INVENTOR.
ROBERT M. CANNON
BY
Reynolds, Beach + Christensen
ATTORNEYS Patented Oct. 12, 1954

2,691,334

UNITED STATES PATENT OFFICE 2,691,334

TRACTOR-TREAD TRACK DIGGER

Robert M. Cannon, Athena, Oreg.

Application July 11, 1950, Serial No. 173,205

5 Claims. (Cl. 97—47.44)

The plowing, cultivating, fertilizing, and seeding of large ranches, hundreds or thousands of acres in one piece, such as compose the rolling wheatlands of central Oregon and Washington where the machine of this invention was devised and first used, can only be successfully accomplished by large pieces of equipment, drawn by heavy tractors. Such tractors have wide treads, and ground being plowed is so compacted by the tractor treads that the dragged plows do not adequately break it up in such tracks, and ground already plowed is so compacted thereby during seeding, for example, that only the seeds which fall on ground not so compacted are likely to sprout and mature to the desired extent. The aggregate area thus compacted constitutes an appreciable percentage of the total area, hence the yield is materially reduced unless the ground behind the tractor treads is immediately broken up again, before the tractor-drawn seeder deposits the seeds on that ground. The present invention provides mechanism for so doing.

This objective in itself is not new. However, the devices heretofore employed for such purpose have not proven altogether satisfactory in the type of country described above, nor for use with the type of heavy tractor commonly used in such country. A track digger device must be provided which is thoroughly rugged and heavy to break up sun-baked and heavily compacted ground, and it must be mounted very close to the tractor treads in order that it will not interfere with the piece of equipment which is being dragged behind the tractor, especially on sharp turns. It must be sufficiently yieldable, notwithstanding its ruggedness and its ability to break up the packed ground behind the treads, to yield automatically when encountering an insuperable obstacle such as a large boulder, rather than breaking the digger frame or teeth. Moreover, since the tractor's treads are spaced rather widely apart, it is undesirable that both such track diggers yield and cease digging when only one has encountered an obstacle. It is preferable that the other one continue to break up the ground behind its tread hence they must be capable of a certain degree of independent yieldability. Nevertheless, if notwithstanding such independent yieldability excessive stresses develop on one thereof in use, the attachment as a whole must be automatically yieldable. When out of use, rigidity of connection between the two diggers is desirable. When making a sharp turn or turnabout, it is essential that the digger teeth on the inside of the turn be capable of yielding and withdrawing automatically from the earth, for they are in effect moved backwardly in making such a turn, yet of course they must be ruggedly resistant to the ground in normal operations so that they will tear up the packed earth.

Such country is traversed by minor water courses or gullies (locally termed "ditches"), such as carry off rain water, but which are normally dry and the tractor passes into and through such gullies with little regard to the difference in contour of the ground, even though the banks of some are rather steep, and so, too, will the equipment behind the tractor. Such auxiliary track diggers must be sufficiently yieldably or flexibly mounted, individually or collectively, that they will pass down into a gully even though the tractor is tilted up as it rides up the opposite bank, still breaking up the track into the gully and out therefrom. This they must do, notwithstanding their ability to yield to obstacles as mentioned above.

The device of the present invention is thoroughly adapted to these ends, and in these respects is an improvement over prior attachments of this same general nature which are known to me, and the provision of an attachment having such advantages is the primary aim of this invention.

In addition, it is desirable, and it is an object of the invention to provide, an attachment of this nature which, when not required for use, can be readily lifted and simply held in inoperative position with a minimum of strain on the parts as it travels over rough ground.

It is also an object to provide an attachment of this nature of simple construction, such as can be adjusted and repaired in ranch shops or the like without undue difficulties or delay.

With these and similar objects in mind, the invention comprises the novel attachment and the novel combination and arrangement of parts thereof, as shown in the accompanying drawings and as will be hereinafter described and claimed.

Figure 1 is a plan view of such a tractor, a gang disk dragged behind it (representative of any tractor-drawn piece of equipment), and the attachment of the present invention applied to it, all in the relative positions that would be occupied in making a turn.

Figure 2 is an enlarged rear elevational view of the attachment, and Figure 3 is principally an axial sectional view through a portion thereof.

Figure 4 is a side elevational view of the attachment showing the manner in which portions thereof may yield in encountering an obstruction, the viewpoint being in effect a section on the line 4—4 of Figure 2.

Figure 5 is a similar view in section on the same line, but showing parts in a different position such as they might occupy during retrograde movement.

Figure 6 is a similar view, the line of section being shown, however, at 6—6 of Figure 2, illustrating parts in an inoperative or out-of-use position.

Figure 7 is a similar view further enlarged, the line of section being at 7—7 of Figure 2, showing parts in the normal operative position.

The tractor is generally indicated at 9 with its wide endless treads 90 and 91 at right and left sides respectively. The invention is not limited, of course, to employment with an endless-tread type of tractor, but would be useful also with a wheeled tractor. However, the heavier tractors used in such work, weighing several tons, are normally mounted on endless treads as shown herein, and these treads are heavily cleated. The tractor also includes at 92 a hitch for connection of the draft bar 89 of an implement 8 such as is shown in Figure 1. In addition, a bracket or brackets 93 are provided upon the rear of the tractor frame for support of the attachment itself, and a hook 94 is carried by the tractor frame in a position elevated above the brackets 93 for the purpose of holding the attachment in inoperative or out-of-use position in the manner shown in Figure 6, and as will be described in greater detail hereinafter.

Two sets of digger teeth 7, 70, of any suitable construction and material, are employed, one set behind each tread 90 or 91, and each set is preferably subdivided into the forward teeth 7 and the rear teeth 70, disposed in staggered relationship. Such sets of teeth are supported by mechanism which is about to be described, as closely as is feasible behind the respective treads, to break up the ground immediately behind the treads as the tractor advances, and to be out of the way of the swing of the draw bar 89 of the implement 8, especially in making sharp turns. Moreover, these teeth, considered collectively, are mounted without any provision for swinging laterally, that is to say, about a vertical axis, with respect to the tractor, and hence since the tractor may be considered as pivoting about a nominal center located within the confines of its treads, in making a sharp turn the teeth on the inside of the turns will in effect move backwardly while those on the outside of the turn are moving forwardly. Provision must be made in the mounting of these teeth for yielding or withdrawing from the ground under such conditions, so that neither set of teeth will be broken. Likewise, provision must be made for yielding in the event an obstruction is encountered by one or both sets of teeth, so that they will not break off, but will swing upwardly out of the ground, as one such set is shown doing in Figure 4, upon encountering a boulder B. As has already been indicated, the set of teeth at the one side should desirably yield upwardly in such case when it encounters the obstacle, but the opposite set of teeth should remain in operative engagement with the ground, and this is permitted by the construction which is about to be described.

The frame as a whole which mounts the teeth is supported from the tractor frame at the two laterally spaced brackets 93, by means of short supporting arms 1, constituting part of a frame-supporting structure, each pivotally mounted about a transverse horizontal axis at 10 to a bracket 93 at the forward end of the arm, and extending thence generally rearwardly and horizontally. Stops 19 on the arms engage the brackets 93 to limit downward swinging of the arms 1 beyond such horizontal position. At its rear end each arm carries a collar 11. Received within the collars and thus supported from the arms 1 is a hollow shaft which completes the frame-supporting structure, and which is preferably formed in two halves, 20 and 21, whereby it may be lengthened to fit a wider tractor, and for independence of tilting movement of the two halves of the frames 3, described hereinafter. A reduced extension 2 is received within each of the shaft halves 20 and 21, and in effect is secured or securable to one or the other such shaft half against axial shifting, as by means of the removable pin 22. It may be similarly secured to the other shaft half, if desired, and in such case removal of the pin 22 permits relative oscillation of one shaft half relative to the other while yet retaining them in coaxial alignment. During normal use the pin 22 is removed, and axial shifting is restrained by other means, as will be described.

In a practical construction each shaft half is secured substantially rigidly within its supporting collar 11 by a set screw 12, but there is enough "give" in the structure as a whole to permit the limited amount of relative tilting about the axis of the shaft 2, 20, 21 that is required in use. However, as a conventional means to emphasize that there is such independent tilting movement of each shaft half relative to the other, the securing set screw 12 in each collar 11 is shown as received within an arcuate slot 24 in its shaft half, and the shaft therefore may tilt or oscillate to a limited extent within its supporting collar, yet the set screws hold the shaft halves against axial separation, and the reduced extension 2 holds them in coaxial alignment.

At each end of the composite shaft, in position immediately behind the treads 90 and 91, respectively, are digger frames which are shown as consisting of upright posts 3, each welded rigidly to and dependent from its shaft half, and connected at their lower ends by a transverse frame bar 30, likewise rigid with the posts 3. Similarly secured to the same shaft half are rearwardly and downwardly directed braces 31, and a second set of braces 32 extends rearwardly and downwardly from the lower bar 30 to a junction with a transverse bar 33, to which are also joined the braces 31, thus forming with the posts 3 a rigid triangular frame.

A supplemental frame is made up of links 34 pivotally mounted at their upper ends at 35 upon the outer side of the posts 3, and hanging downwardly from this pivot mount to a level below the bar 30 of the main frame, where the links are joined by a transverse bar 36. By a pin and arcuate slot connection, as indicated at 37, see Figure 7, the supplemental frame 34, 36 may swing to a limited extent in a rearward and forward manner with respect to the main frame 3, 30, 31, 32, 33.

The forward teeth 7 in each set are strapped or otherwise secured at 71 to a shaft 72, which is mounted within the supplemental frame within the angle of the bar 36, and the provision may be such that the teeth may be adjusted downwardly as they wear or upwardly to lessen the extent of their projection into the ground, the level whereof is indicated at G. The teeth 7 are rotatably or tiltably mounted by reason of their securement to the rotatable shaft 72, but their upper ends project far enough to engage the bar 30, which serves as a stop to limit the rearward rotational movement of the lower or working ends of the teeth 7, without, however, restricting their freedom to rotate in the opposite direction when necessary. The limited pivotal mounting of the supplemental frame, permitted by the pin and arcuate slot connection at 37 will likewise afford some shifting in the position of the teeth 7 with respect to the ground and with respect to the supporting frame.

The rear teeth 70 are similarly mounted, being strapped by straps 71 to a rotative shaft 73 which is pivotally mounted to the bar 33 at the junction of the braces 31 and 32. The shaft 73 carries at one or both ends a stop element 74, which upon engagement with a fixed stop 75 on the brace 32 limits rearward rotation of the lower ends of the teeth 70 to maintain them in operative position, but does not prevent their rearward rotation to an inoperative position when that becomes necessary.

In each outer end of the composite shaft 2, 20, 21 is received a stub shaft 40, to the exterior end of which is secured a lever 41 which extends, in operative position, rearwardly from the transverse shaft, and which carries at its rear end, and preferably adjustable lengthwise of itself, a heavy weight 4. During normal operation each stub shaft 40 is locked nonrotatively and against axial displacement relative to its supporting shaft half 20 or 21 by means such as the through pin 42, and as an incidental advantage, they retain the extension 2 against axial withdrawal, if it is loose within the shaft halves 20, 21. By such means the weight develops a downward moment about the shaft's axis on the corresponding frame 3, 30, and hence on the teeth 7, 70, pressing the latter into the ground with such force as is produced by reason of the mass and its effective lever arm of the weight. The shaft half 20 or 21, as the case may be, tends to tilt within its supporting collar 11, to the extent permitted by the stops at 12, 24, if the latter are used. The entire assembly likewise is urged to rotate downwardly bodily about the axis of the transverse pivot mount at 10 of the arms, to the extent permitted by the stops 19 already mentioned, which hold the arms 1 normally in rearwardly directed, substantially horizontal position. The downward urging of the weights on the respective frames 3, 30, etc., is ordinarily sufficient, and the stops limit such movement to a position, such as to cause the teeth 7, 70 to press to the depth desired into the earth.

Although the frames 3 each constitute a weight pivoted upon the axis 2, 20, 21 to hang downwardly and to resist upward, rearward swinging, and also pull downwardly upon the short arms 1, it is the weights 4 at the outer end of their respective longer, horizontal arms 41 which play the largest part in maintaining all elements in the position shown, for instance, in Figures 4 (at the near side) and 7. These weights 4 urge the rear end of their levers 41 downwardly about the axis of the composite shaft 2, 20, 21 until stops 12, 14 limit such movement with respect to the arms 1, and so long as the stops 12, 14 are thus engaged the downwardly-urged levers 41 become in effect the outer portion of a longer lever, the inner part whereof is constituted by the arms 1, for the weights then urge the arms 1 downwardly about their pivot mount at 10, until the stops 19 contact the brackets 93. This is the ordinary or normal operative position of the parts, and while parts are in this position the posts 3 are upright, and the ground-engaging teeth 7, 70 being urged rearwardly by the forward movement of the tractor, their upper ends are swung forwardly into contact with their stops, and so they are likewise held upright in their normal operative position. Nevertheless, the assembly as a whole, and the individual parts thereof, are only yieldingly held in their respective normal operating positions, for the reason that the force so holding them is primarily the weight 4, which is free to yield upwardly, either about the pivot axis at 2, 20, 21 or that at 10, if a superior opposed force is effective upon any part of the assembly.

Should one of the sets of teeth, for example, the one at the far side of the assembly in Figure 4, encounter an obstacle such as the boulder B, this set of teeth and its supporting frame—but not necessarily both sets—will merely rise and swing freely rearwardly and upwardly until the teeth clear the ground and the obstacle, yet the teeth on the near side, the other set, will ordinarily remain in operative position projecting into the ground, and do not interrupt the breaking up of the soil behind this particular tread. A similar action takes place should the tractor cross a steep ditch, and particularly if it crosses it diagonally. Each frame and set of teeth can yield individually to follow the contour of the ground without rising from it, that is to say, each may tilt with respect to the other to a sufficient degree to continue to break up the ground across a gully or ditch. If, however, the obstacle should be more than ordinarily large or resistant, or if it should be encountered by both sets of teeth, the weight will not be sufficient to maintain the frames in their lowered operative position, and the assembly as a whole may yield upwardly and rise freely about the pivot at 10, in the manner shown in dash lines in Figure 7, so that the teeth will ride over the larger or more resistant obstacle rather than be broken by it.

At the end of a row the tractor customarily makes a sharp turn, and in so doing, as it is shown in Figure 1, the inside track 91 will reverse while the outside track 90 is going forward. The pivotal mounting of the teeth with respect to their immediate supports permits the teeth to swing their points upwardly and forwardly as such retrograde movement begins, until they ride over the ground in the manner shown in Figure 5. Immediately forward movement at this side recommences, the teeth will dig in and come against their stops 30 or 75, where they will be again in operative position and will dig in.

When the digger attachment is no longer needed, rather than go to the trouble of dismounting it, it has been found preferable to join the two halves together by insertion of pins 22, so that the entire attachment is relatively rigid, and to elevate it to an inoperative position such as has been shown in Figure 6. The single eye 5 is engaged by the hook 94 previously referred to, to retain parts thus upraised to out-of-use position, with the arms 1 generally uprightly and the posts 3 generally horizontally disposed. There is no reason for maintaining the heavy weights 4 in what would now be a generally upright position. Instead the pins 42 are removed, and the weights and their levers 41 are permitted to hang pendant, or may be secured in pendant position by reinsertion of the pin 42 to hold parts in the 180° removed out-of-use position which they occupy in Figure 6.

It will be observed that the draft bar 89 of the implement 8 is very little restricted in its freedom of movement in making a turn, by the attachment. The draft bar will override the frame elements 31, and if it contacts them at all it will only serve to hold the frame downwardly the more strongly, and no harm is likely to result, particularly since the teeth, if this side is moving rearwardly, will pivot about their pivot shafts 72 and 73 so that they are no longer digging into the ground. The digger attachment insures that the ground immediately behind the tractor's treads will always be broken up, before the trailing implement arrives, and that the uniformity of the field will not be marred by, nor its productivity reduced by, the tread tracks.

I claim as my invention:

1. A tractor attachment, to break up the ground behind the tractor's treads, comprising a transverse shaft, a generally dependent frame secured to the right and left ends of said shaft, respectively, a set of digger teeth mounted at the lower end of each frame, in position immediately behind each tread, laterally spaced arms pivotally mounted to the tractor to swing about a transverse axis, and extending thence rearwardly and generally horizontally while in operative position, means supporting the shaft and hence the frames and their teeth from said arms for limited tilting of either frame, independently of tilting of the other, rearwardly and upwardly relative to the arms and to the other frame, a lever fixed to each frame and extending rearwardly, and a weight carried by the rear portion of each lever, and urging the frames individually forwardly and their teeth downwardly, and the shaft and the arms downwardly, but yieldable for upward and rearward swinging of either frame individually upon encountering an obstacle, or for collective upward and rearward swinging of the shaft and arms to accommodate changes in the ground's contour.

2. A tractor attachment, to break up the ground behind the tractor's treads, comprising a transverse shaft divided between its ends into two coaxial but relatively oscillatable halves, two arms, one secured to each half, and each fixedly pivotally mounted upon the tractor to swing about a transverse axis, a pendent frame secured to each shaft half, a set of digger teeth mounted upon each frame, in position immediately behind the tread at its side of the tractor, and normally disposed in upright operative position, a lever pivotally mounted at each shaft end, extending thence rearwardly in operative position, and carrying a weight which urges the shaft half and frame downwardly and its teeth into the ground, and means to lock the lever to its shaft half in such operative position, or to release the lever for rotation into pendent, inoperative position.

3. A tractor attachment as in claim 2, characterized in that the engagement of the arms with the respective shaft halves, and of the two halves with each other, is organized and arranged to afford limited rearward and upward tilting movement of each frame relative to the other, about the shaft's axis.

4. A tractor attachment as in claim 2, including releasable means to lock the two shaft halves against relative oscillation, and means to secure the shaft in upraised inoperative position, with the supporting arms rotated upwardly from their pivot axis.

5. A tractor attachment as in claim 2, wherein each pendent frame comprises upright posts and a lower transverse bar rigidly connecting said posts, the posts themselves being rigidly connected to the corresponding shaft half, rearwardly and downwardly angled braces extending from the upper and lower portions of the frame and joined at a point to the rear thereof, certain of the digger teeth being pivotally mounted on transverse axes at that point, stop means arranged to limit rotation of such teeth to retain them in upright position during their forward movement, but to permit their unrestricted rotation to inoperative position during their retrograde movement, generally upright links pivotally mounted by their upper ends upon the posts for limited rearward and forward movement relative to the frame, additional digger teeth being pivotally mounted upon said links to rotate about a transverse axis intermediate the upper and lower ends of the teeth, and located below said transverse frame bar, the upper ends of such teeth engaging said bar, at the rearward limit of the links' rearward movement, to stop pivotal movement of such teeth about their own pivot axis in generally upright operative position, such teeth having unrestricted pivotal movement of their upper ends rearwardly towards horizontal position upon their retrograde movement.

References Cited in the file of this patent

UNITED STATES PATENTS

| Number | Name | Date |
|---|---|---|
| 701,541 | Churchman | June 3, 1902 |
| 950,852 | Kemp | Mar. 1, 1910 |
| 968,976 | Ploen | Aug. 30, 1910 |
| 1,041,275 | Harris | Oct. 15, 1912 |
| 1,083,446 | Johnson | Jan. 6, 1914 |
| 1,171,178 | Demmer | Feb. 8, 1916 |
| 1,332,643 | Thomas | Mar. 2, 1920 |
| 1,541,162 | Mercer | June 9, 1925 |
| 1,773,537 | Lemmons | Aug. 19, 1930 |
| 1,886,438 | Weeks | Nov. 8, 1932 |